T. B. ATTERBURY.
Covered Glass-Ware.
No. 159,628.    Patented Feb. 9, 1875.
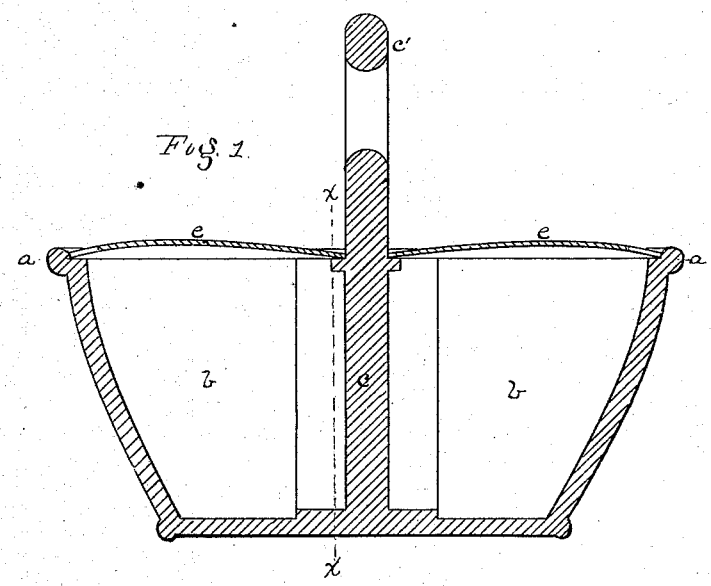
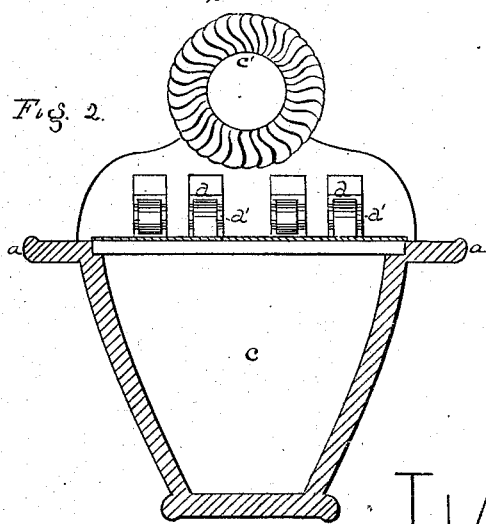
Witnesses
James G. Kay
Frederick Standish
Inventor
Thomas B. Atterbury
by Bakewell & Kerr
Attys.

UNITED STATES PATENT OFFICE.

THOMAS B. ATTERBURY, OF PITTSBURG, PENNSYLVANIA.

IMPROVEMENT IN COVERED GLASSWARE.

Specification forming part of Letters Patent No. 159,628, dated February 9, 1875; application filed September 1, 1874.

*To all whom it may concern:*

Be it known that I, THOMAS B. ATTERBURY, of Pittsburg, in the county of Allegheny and State of Pennsylvania, have invented a new and useful Improvement in Articles of Glass and similar ware; and I do hereby declare the following to be a full, clear, and exact description thereof, reference being had to the accompanying drawing forming a part of this specification, in which—

Figure 1 is a longitudinal vertical section of a glass article embodying my invention; and Fig. 2 is a transverse vertical section on the line $x\ x$ of Fig. 1.

Like letters of reference indicate like parts in each.

My invention relates to articles of glassware; and consists in combining metallic covers with a concave dish having a pressed-glass septum or partition and a pressed-glass handle, the handle and septum being so formed that the metallic covers may be hinged directly thereto, whereby metallic rims or bands and cross-pieces are avoided.

As an illustration of my invention, I have shown in the drawing, a basket-shaped glass dish, having a horizontal rim, $a$, the general outline of which dish is oval, and within which are the two depressions or chambers $b\ b$, separated by the glass partition or septum $c$, extending across the cavity from side to side, and dividing it into two chambers, the partition $c$ terminating above in the handle $c'$. This portion above the line of the rim is slotted, as shown at $d$, said slots being crossed by the glass pivot pieces or similar devices $d'$, which are formed at the time of pressing up the article. $e\ e$ are a couple of metallic covers resting upon the rim $a$, and hinged to the partition by means of the slots $d$ and glass pivots $d'$, the pivots $d'$ forming the pintles for the hinge connection of the lid, the metallic lids $e$ being formed with tongues or projections, which may be bent around the glass pivots $d'$, and secured by soldering or otherwise.

The article is formed by pressing, the mold being of the following general construction—that is to say, the outer mold of the form desired for the bowl, and a divided plunger to form the concavities within the bowl, the septum or partition and handle being formed by a jointed open and shut or flap mold, within the inner faces of which are depressions of the general form of the handle and septum to be formed, and projections or stop-outs for clearing the pivots or pintles to which the lids are to be connected.

The several devices operate as follows: The jointed open and shut mold, which contains the depressions for forming the handle and septum, may be placed centrally within the lower portion of the mold which is to form the bowl of the article, and the molten glass is then supplied to the lower mold on both sides of the open and shut mold. The divided plunger is then brought down, straddling the open and shut mold, and, forcing the glass up into the cavity of the jointed open and shut mold, forms at one operation the septum, handle, and bowl.

In practice, I propose to make all or any of the various shapes and forms known to the trade, and produce such articles as cracker-bowls, fruit-bowls, peppers, and salts, &c., though for the purposes of this invention, I have simply shown a dish of one form.

I do not herein claim any special form of mold for producing the above result, nor do I claim a concave dish or other article of glassware having a pressed-glass partition and a pressed-glass handle. I am also aware that articles of porcelain, such as cracker and saloon lunch-bowls, have been made with a central partition of similar ware to the body of the bowl, and have been provided with metallic covers, said covers being secured by means of a metallic rim or band and cross-piece, and, therefore, do not claim such devices or construction; but

Having thus described my invention, I claim—

The metallic covers $e$, in combination with a glass dish, having a pressed-glass partition and handle, said handle and partition being formed with pivots or pintles so that the metallic covers may be hinged directly thereto, substantially as and for the purpose specified.

In testimony whereof I, the said THOMAS B. ATTERBURY, have hereunto set my hand.

THOS. B. ATTERBURY.

Witnesses:
JAMES I. KAY,
F. W. RITTER, Jr.